United States Patent [19]
Aucsmith

[11] Patent Number: 5,621,798
[45] Date of Patent: Apr. 15, 1997

[54] METHOD AND APPARATUS FOR COOPERATIVE MESSAGING

[75] Inventor: David W. Aucsmith, Portland, Oreg.

[73] Assignee: Intel Corporation, Santa Clara, Calif.

[21] Appl. No.: 423,306

[22] Filed: Apr. 18, 1995

[51] Int. Cl.$^6$ ........................................... H04K 1/00
[52] U.S. Cl. ................. 380/25; 340/825.07; 340/825.52; 364/242.95
[58] Field of Search .............................. 380/3, 4, 23, 25; 340/825.07, 825.52; 364/242.95

[56] References Cited

U.S. PATENT DOCUMENTS

| | | | |
|---|---|---|---|
| 5,499,297 | 3/1996 | Boebert | 380/23 |
| 5,515,439 | 5/1996 | Bantz | 380/23 |
| 5,539,824 | 7/1996 | Bjorklund | 380/21 |

Primary Examiner—David C. Cain
Attorney, Agent, or Firm—Blakely, Sokoloff, Taylor & Zafman

[57] ABSTRACT

A wireless network is disclosed that comprises base transmitter/receiver stations coupled to a trunk communications network and several mobile computing devices that are capable of transmitting and receiving messages. Messages to be transmitted will be encrypted and digitally signed to insure privacy and authentication of the messages. Each mobile computing device that participates in the wireless network is capable of voluntarily allocating some amount of memory for cooperative messaging storage. Each mobile computing device is responsible for receiving messages addressed to other devices, storing the received messages in the allocated memory and then periodically retransmitting the received messages. Each message includes a unique serial number and time/date stamp. The message serial numbers are used to prevent duplicate messages being stored in the allocated memory. Furthermore, the time/date stamps on the messages stored in the allocated memory are periodically examined such that outdated messages are automatically killed after some specified time interval.

9 Claims, 6 Drawing Sheets

METHOD AND APPARATUS FOR COOPERATIVE MESSAGING

FIELD OF THE INVENTION

The present invention relates to the field of digital communications. Specifically, the present invention discloses a cooperative digital communications system based upon portable computer devices.

BACKGROUND OF THE INVENTION

To facilitate the transfer of digital information between computer systems, computers are often connected together in networks. For example, the personal computers at most offices are coupled together using a local area network (LAN) such as Ethernet. Coupling together the personal computers in an office enables the co-workers to quickly easily transmit electronic mail messages and transfer data files.

To further make computer resources easily accessible, many people now use portable computer systems. Portable computer systems enable a user to access computer resources anywhere, anytime. Portable computer systems range in power and complexity from small simple palmtop organizers to portable workstations.

However, a portable computer system is often not easy to incorporate into a computer network due to its portable nature. Currently, network communication with portable computer systems is based on one of two paradigms: (1) A direct connection from the portable computer system to a computer communications infrastructure thereby allowing full network access; or (2) The composition and queuing of messages, pending a direct connection to the communication infrastructure.

Only when a portable computer system has a direct connection to a computer communications infrastructure can the portable computer system transmit electronic message. The direct connection between the portable computer system and the computer communications infrastructure can consists of a direct wired connection or a wireless connection.

Examples of direct wired connections between a portable computer system and a computer communications infrastructure include Ethernet LAN connections, a token ring LAN connections, or a telephone line and a modem. Direct wired connections usually are the most cost-effective computer communication solutions, however direct wired connections cannot be used in portable computer systems such as palmtop computers that are used during transit.

Alternatively, the direct connection between the portable computer system and the computer communications infrastructure may comprise a wireless connection such as a wireless cellular modem or digital packet radio. An important aspect of a wireless communication system is the amount of "coverage" that is supported by the wireless communication system. The coverage is defined as an area from which a user can send and receive messages. The coverage area can be quantified by its size and location. If a user moves out of the coverage area, the user will be unable to send or receive messages.

To increase the coverage area of a wireless system, wireless communication vendor can install more transmitter/receiver stations. Alternatively, the wireless communication vendor can amplify the signals transmitted by the transmitter/receiver stations. Either solution requires a major investment by the wireless communication vendor.

If a user of a wireless communications service moves out of the coverage area, then the portable computer system can not send or receive any messages. To handle electronic messaging while a portable computer system is not connected to a computer communications infrastructure most portable computer systems allow for the composition and queuing of messages, pending a direct connection to the communication infrastructure. When the portable computer system eventually establishes direct connection with the computer communications infrastructure, all the queued messages are then transmitted. Thus, any queued message must wait an indeterminate amount of time until a direct connection is established so that messages can be transmitted.

To reduce the lag time for pending messages, it would be desirable to increase the coverage area of a wireless communication system. However, increasing the coverage area of a wireless communication system usually requires the added cost of installing additional transmitter/receiver stations. Thus it would be desirable to find an inexpensive method of increasing the coverage area of a wireless communication system.

SUMMARY AND OBJECTS OF THE INVENTION

It is therefore an object of the present invention to enlarge the effective coverage area of a wireless communication system. This and other objects are accomplished by the wireless cooperative messaging system of the present invention.

In the present invention, a wireless network is built that comprises base transmitter/receiver stations coupled to a trunk communications network and several mobile computing devices that are capable of transmitting and receiving messages. Messages to be transmitted will be encrypted and digitally signed to insure privacy and authentication of the messages. Each mobile computing device that participates in the wireless network is capable of voluntarily allocating some amount of memory for cooperative messaging storage. Each mobile computing device is responsible for receiving messages addressed to other devices, storing the received messages in the allocated memory and then periodically retransmitting the received messages. Each message includes a unique serial number and time/date stamp. The message serial numbers are used to prevent duplicate messages being stored in the allocated memory. Furthermore, the time/date stamps on the messages stored in the allocated memory are periodically examined such that outdated messages are automatically killed after some specified time interval.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Although the present invention has been described in terms of specific exemplary embodiments, it will be appreciated that various modifications and alterations might be made by those skilled in the art without departing from the spirit and scope of the invention as set forth in the following claims.

Ground antenna based wireless networks have limited coverage areas due to transmitter range and geographic features. The coverage area of the wireless network is defined as the areas from which the user of the wireless network can send and receive messages. The size and shape of the coverage area is defined by the positioning of the ground based antennas and the power of the ground based antennas.

Figure 1:
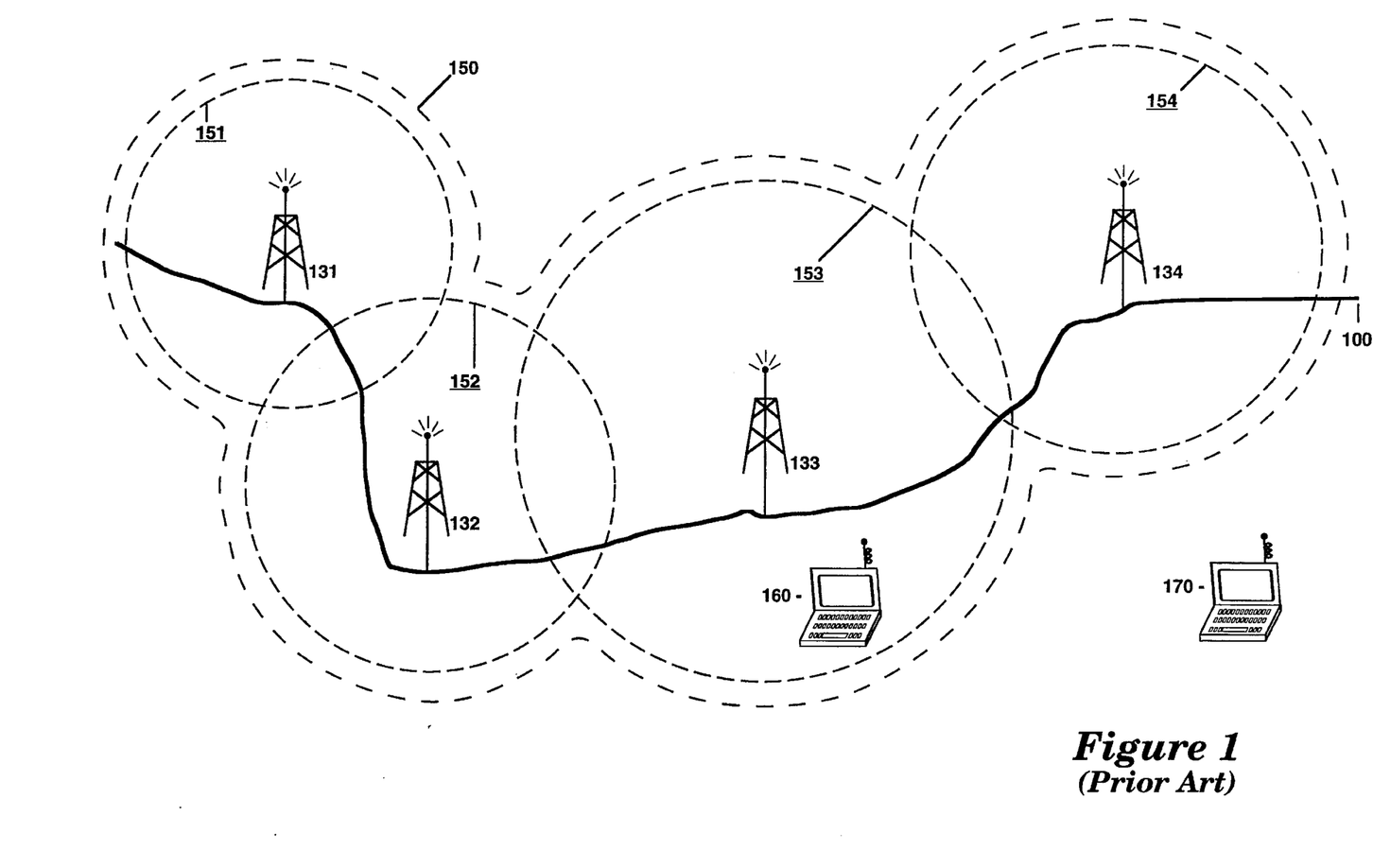
FIG. 1 illustrates an existing wireless network.

FIG. 1 illustrates an existing wireless network based upon ground antennas. The ground based network of FIG. 1 consists of several transmitter/receiver towers 131, 132, 133 and 134. Each transmitter/receiver tower has a corresponding range from which the transmitter/receiver tower can receive signals from portable devices and from which the transmitter tower can transmit messages to portable devices. As illustrated in FIG. 1 each transmitter tower 131, 132, 133 and 134 has a corresponding range 151, 152, 153 and 154 respectively. To carry messages between the different transmitter/receiver towers a trunk communication 100 couples the receiver transmitter/receiver towers. The coverage area of the wireless network of FIG. 1 is defined by adding up the ranges of the different transmitter/receiver towers such that the coverage area of the wireless network of FIG. 1 is defined by 150. Whenever a portable computer device such as portable computer device 160 is within the coverage area 150 of the wireless network, the portable computer device 160 can send and receive messages on the wireless network. However, when a portable computing device such as portable computing device 170 strays out of the coverage area 150 of the wireless network, it can no longer send or receive messages through the wireless network and it must store any messages that need to be sent in a queue.

A COOPERATIVE WIRELESS MESSAGING NETWORK

The present invention introduces the concept of a wireless cooperative messaging network. In a cooperative wireless messaging network each unit that can send or receive messages is used as a transmitter/receiver station for the network. Thus, every portable computer system that is a user of the network also acts as a transmitter/receiver tower for the network.

Figure 2:
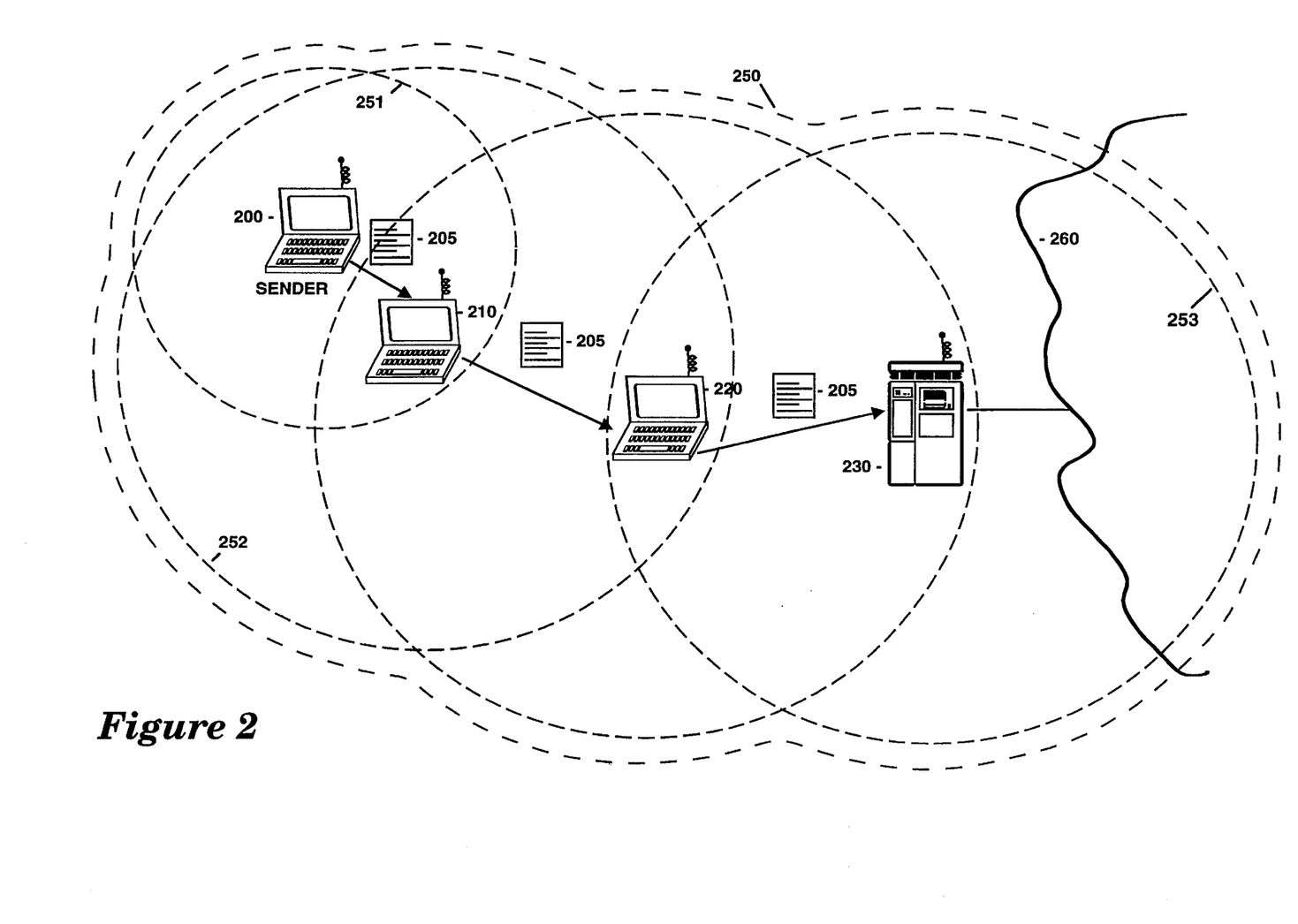
FIG. 2 illustrates an electronic message that is passed from a first portable computer system to a computer communications infrastructure by passing through several portable computer systems that are successively closer to the computer communications infrastructure.

FIG. 2 illustrates how the cooperative wireless messaging network of the present invention can be used to extend the coverage area with the wireless network. Referring to FIG. 2, trunk communication line 260 is the wired backbone of the network. Connected to the trunk communication line 260 is a transmitter/receiver station 230. Portable computer system 200 is a user of the wireless network. As illustrated in FIG. 2, the transmitting range of personal computer system 200 is too small to transmit to the network transmitter/receiver station 230.

In the cooperative wireless networking system of the present invention, all of the portable computer systems transmit messages whether or not they know they are in the coverage area of the wireless system. Each message that is transmitted includes a unique serial number identifier and a time/date stamp. As illustrated in FIG. 2, when computer system 200 sends the message 205, it happens to be received by computer system 210 which is within the transmission range of portable computer system 200. Computer system 210 is also not within the coverage area of the main wireless network; however, computer system 210 retransmits message 205 such that it is received by both the message originator computer system 200 and computer system 220. Message originator computer system 200 recognizes the message 205 as the message that it recently sent and thus discards the message. However, computer system 220 recognizes the message as a new message and keeps it in a transmission buffer.

Computer system 220 eventually retransmits message 205 such that the message is received by both computer system 210 and transmitter/receiver station 230. Computer system 210 recognizes the message 205 as the message that it recently transmitted and thus discards the message. However, the transmitter/receiver station 230 takes the message and transmits the message along the network trunk communication line 260 such that message 205 that originated with computer system 200 is transmitted along the network backbone 260 even though computer system 200 is not within the coverage area of the wireless network. To prevent further retransmissions of the message 205, the transmitter/receiver station 230 broadcasts a confirmation message out on the wireless network. The confirmation message includes the unique serial number identifier that identifies the received message. Each mobile computer system that receives the confirmation message having the unique serial number identifier examines its outgoing message queue and deletes any messages having that unique serial number identifier. The mobile computer system may also retransmit the confirmation message such that other mobile computer systems will learn about the confirmed message.

Thus, as illustrated in FIG. 2 the coverage area of the wireless network has been extended by the use of computer systems 220, 210 and 200. The coverage area of the network has been effectively increased such that it now includes all of the transmission receive ranges of the computer systems.

As illustrated in the example of FIG. 2, the messages in the cooperative wireless network maybe received by many different mobile computer system while en route. A user of one of the mobile computer system along the route may surreptitiously examine the messages that are addressed to another device. To prevent such unauthorized access to messages that are addressed to a different party, the messages that are transmitted by the cooperative wireless network should be encrypted before transmission.

Figure 3A:
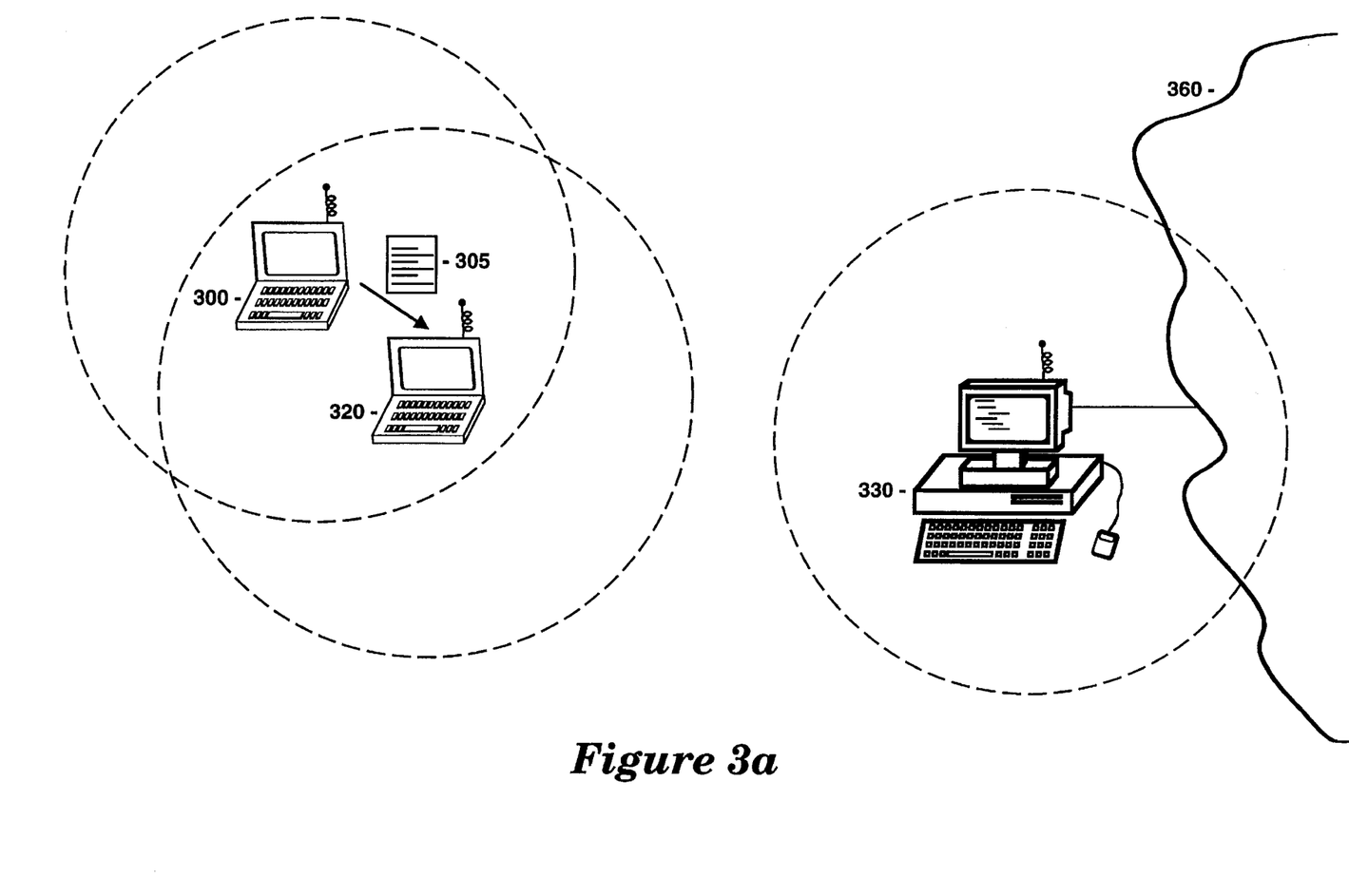
FIG. 3a illustrates a first portable computer system transmitting a message to a second portable computer system that is nearby.
Figure 3B:
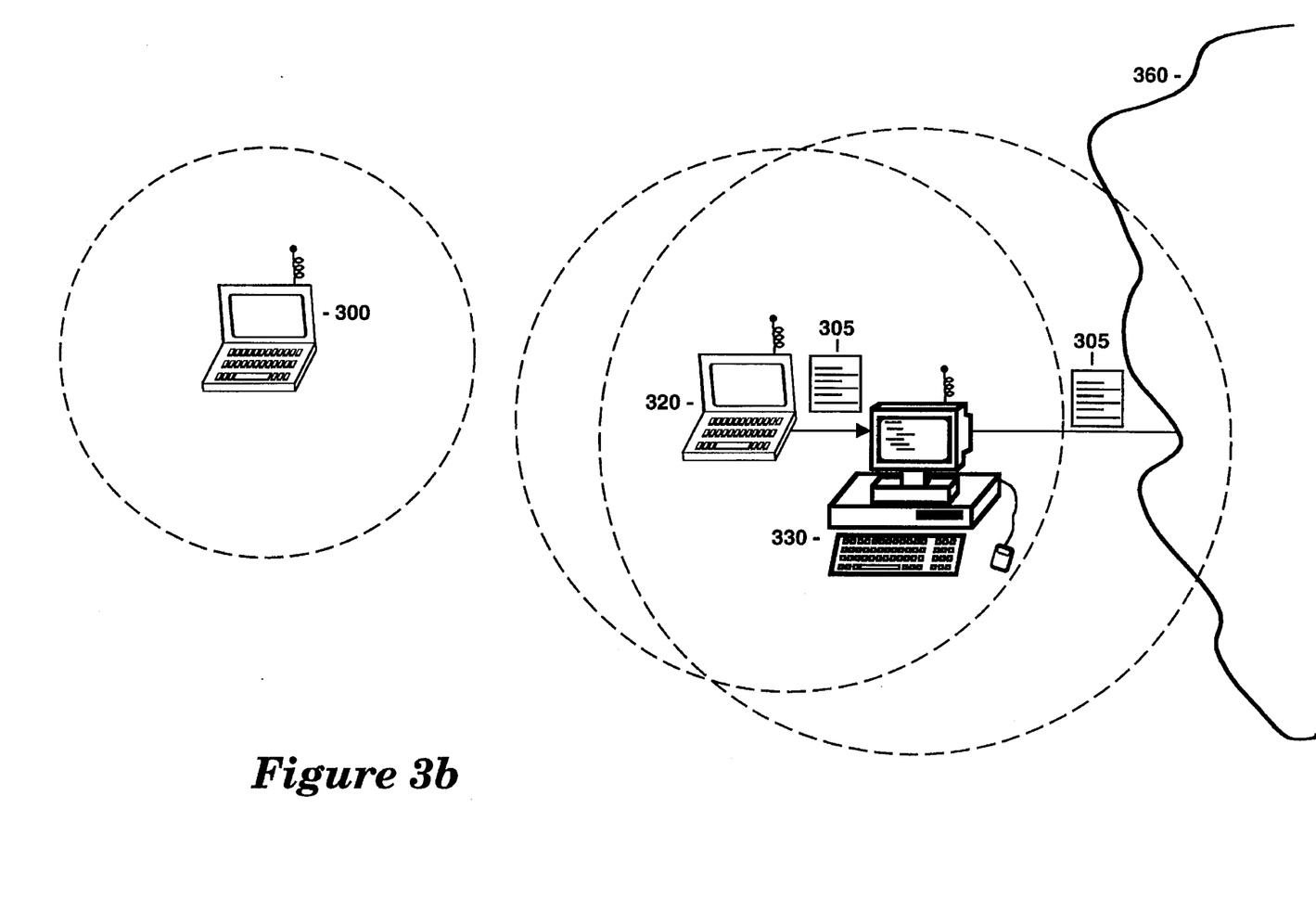
FIG. 3b illustrates the second portable computer system transmitting the message to a computer system that is connected to a wired computer communications infrastructure.

Since the portable computer systems that use a cooperative wireless network of the present invention are not stationary, the coverage area of the cooperative wireless network is not static. FIGS. 3a and 3b illustrate an example of how the dynamic nature of the cooperative wireless messaging system can transport messages far out of the normal coverage area. As illustrated in FIG. 3a, portable computer system 300 transmits a message 305 to computer system 320. Computer system 320 may attempt to transmit the message; however, the only computer system currently within the range of computer system 320 is the originator portable computer system 300. Thus the message 305 only exists in computer system 300 and computer system 320.

Referring to FIG. 3b, if the user that own portable computer system 320 moves to a position such that it is closer to network transmitter/receiver station 330, computer system 320 will then broadcast the message 305 such that it is received by transmitter/receiver station 320. Transmitter/receiver station 330 then transmits the message 305 onto the network backbone 360. Thus, messages may be transmitted to and from computer systems far outside of the normal wireless network coverage area.

IMPLEMENTATION OF THE COOPERATIVE WIRELESS MESSAGING NETWORK

Figure 4:
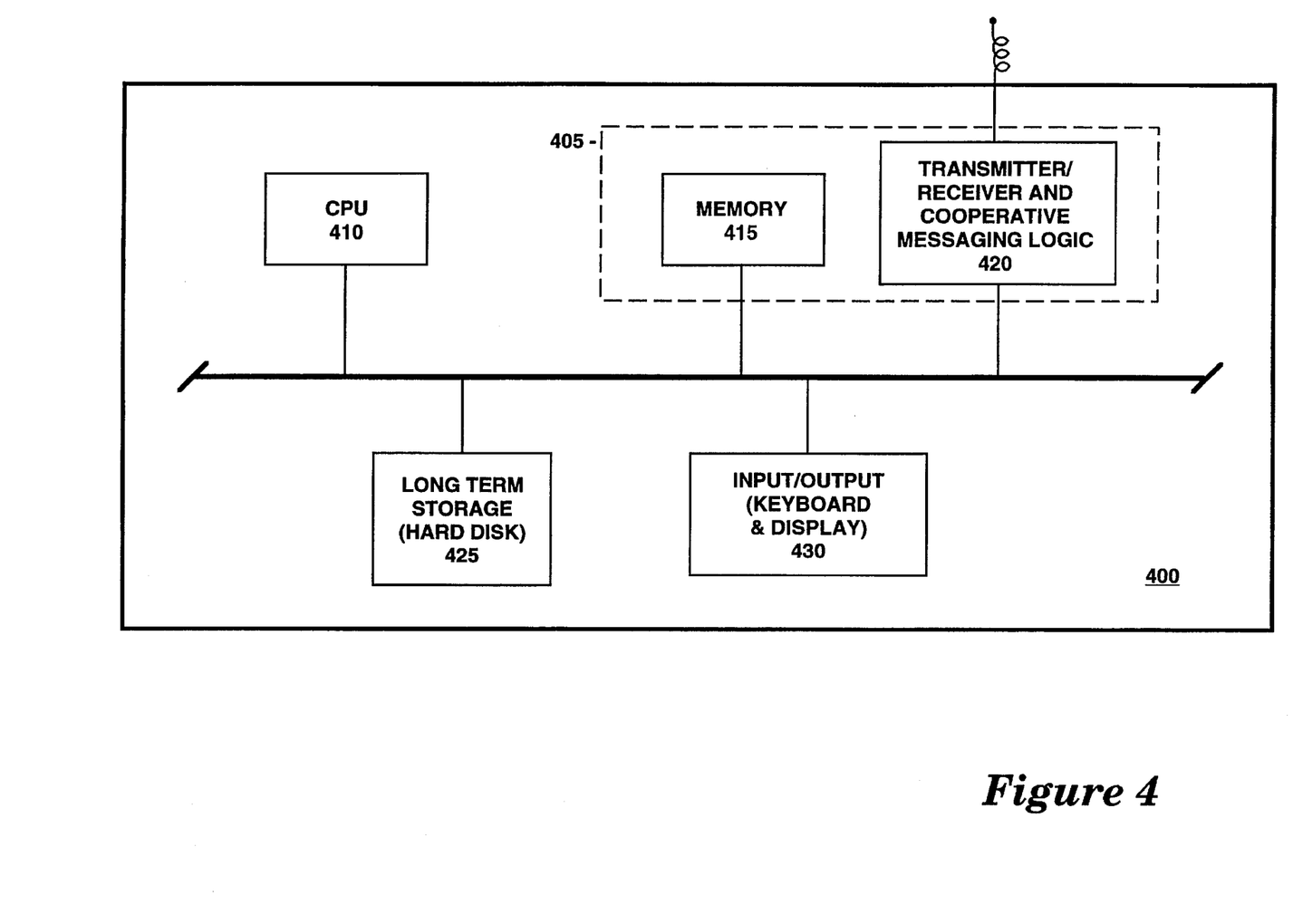
FIG. 4 illustrates a block diagram of the wireless cooperative message passing subsystem hardware.

FIG. 4 illustrates one possible implementation of a portable computer system that implements the cooperative wireless messaging system. In the implementation of FIG. 4, the computer system comprises a central processing unit 410, a memory 415, a long term storage a 425, and input/output devices 430. These components are the same as found in any general purpose computer.

To implement the cooperative wireless networking system, the portable computer system 400 includes a transmitter/receiver component with cooperative messaging logic 420. The transmitter/receiver 420 is capable of sending and receiving messages to transmitter/receiver stations in the wireless network system and other portable computer systems that also have transmitter/receiver components.

The transmitter/receiver component 420 uses a region of the computer memory 415 for storing messages. Thus the computer memory 415 and the transmitter/receiver component 420 together act as the cooperative wireless messaging subsystem 405. The cooperative wireless messaging subsystem 405 shares the memory 415 with other programs running on the central processing unit 410 of the portable computer system 400. A user of the portable computer system 400 can select how much of the computer memory 415 will allocated to the cooperative wireless messaging subsystem 405. Thus, if the user is using memory intensive applications, the user can eliminate all memory allocated to the cooperative wireless messaging subsystem 405 such that it becomes inoperative. Alternatively, an operating system can dynamically change the allocation to the cooperative wireless messaging system by eliminating memory given to the wireless messaging subsystem 405 whenever more memory is required by the applications running on the computer system 400.

Figure 5:
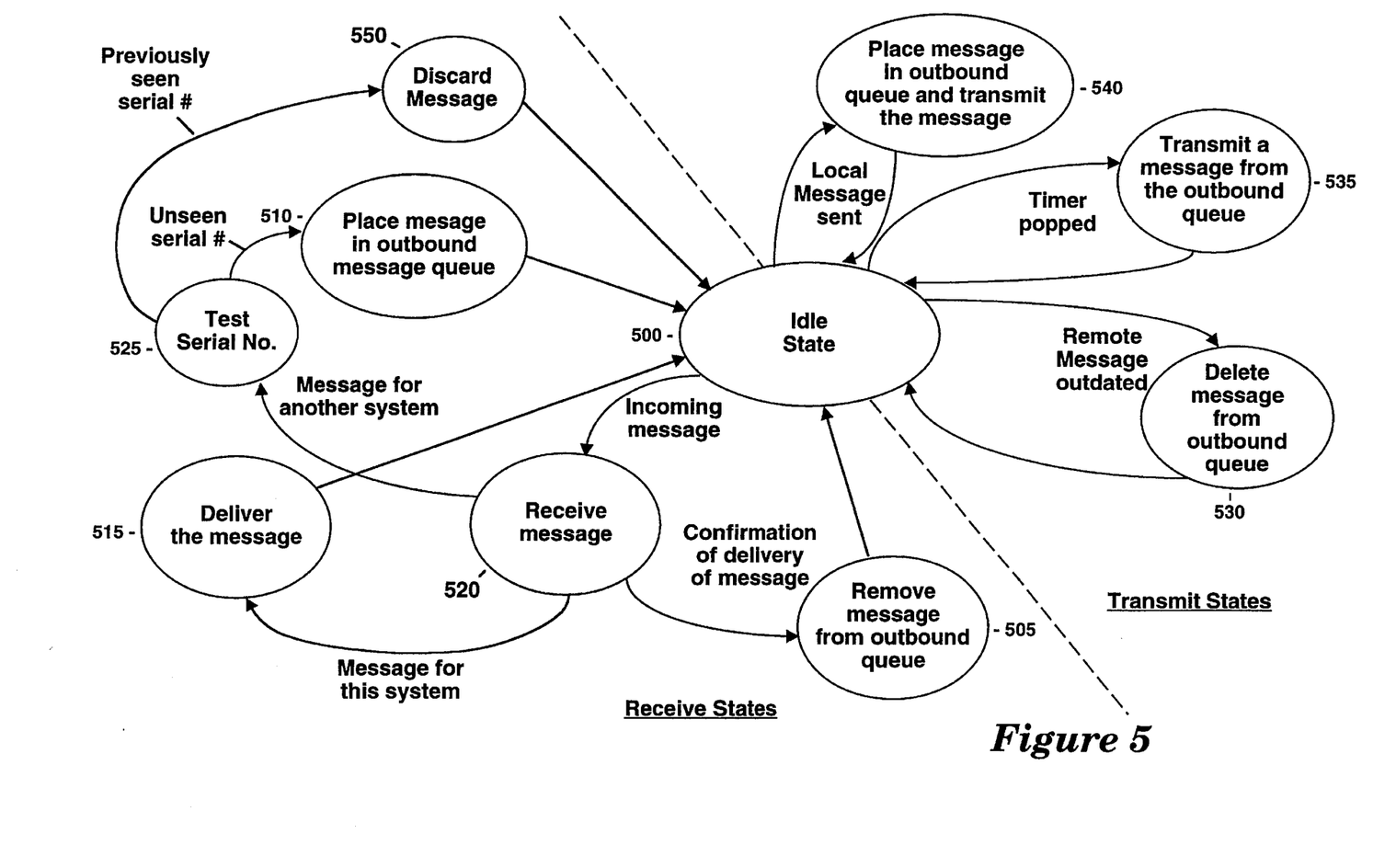
FIG. 5 illustrates a state diagram of the wireless cooperative message passing subsystem.

FIG. 5 illustrates how the cooperative wireless messaging system logic operates. Normally the cooperative wireless messaging system logic remains in an idle state 500. When the local portable computing system sends a message, the cooperative wireless messaging system logic proceeds to state 540 where it places the outgoing message in an outbound queue. When the outgoing message is placed in the outbound queue, a time/date stamp and a unique identifying serial number are added to the message. The cooperative wireless messaging system logic then transmits the message with its accompanying time/date stamp and unique serial number across the airwaves. After transmitting the message the cooperative wireless messaging logic returns to the idle state 500. Periodically when a timer pops the cooperative wireless messaging logic goes to a transmission state 535. In the transmission state, the cooperative wireless messaging logic retransmits some or all of the messages that are within the outbound queue out into the air waves. After transmitting the messages, the cooperative wireless messaging logic returns to the idle state 500.

Occasionally, the wireless messaging logic 505 tests the time/date stamps of the messages in outbound queue. When the cooperative wireless messaging logic 505 detects a message in the outbound queue that has become outdated as determined by a set message life length, the cooperative wireless messaging logic moves to state 530 where it deletes the outdated message from the outbound queue.

When the cooperative wireless messaging logic receives a message, the cooperative wireless messaging system 505 proceeds to receive message state 520. In the received message state 520, the wireless cooperative messaging logic examines the unique serial number and address of the message. If the address of the message is for this particular portable computer system, then the wireless cooperative messaging logic proceeds to state 515 where it delivers the message and returns back to the idle state. If the message is addressed to another system, the cooperative wireless messaging logic moves to state 525. In state 525, the cooperative wireless messaging logic tests the unique serial number of the message. If the serial number is an unseen new serial number, the cooperative wireless messaging logic places the message into the outbound message queue and returns to see the idle state 500. Otherwise, if the serial number is the same serial number an existing message in the outbound queue, the message is simply discarded and the system returns to the idle state 500. If the message received is simply a confirmation message which confirms the delivery of a message to the backbone of the network, then the system moves to state 505. At step 505, the cooperative wireless messaging logic examines the outbound message queue to see if a message having the same unique serial number exists in the outbound queue. If that message exists in the outbound queue it is removed and the cooperative wireless messaging logic returns to idle state 500.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A wireless network apparatus, said wireless network apparatus comprising the elements of:

a wired communication network;

at least one transmitter/receiver base station, said transmitter/receiver base station coupled to said wired communication network;

at least one mobile communication device, said mobile communication device comprising the elements of a transmitter/receiver component, said transmitter/receiver component for transmitting outbound messages and for receiving broadcast messages from said transmitter/receiver base station and other mobile communication devices;

a memory unit, said memory unit for storing messages; and a cooperative messaging logic for controlling said transmitter/receiver component, said cooperative messaging logic for periodically retransmitting an outbound message using said transmitter/receiver component until a corresponding confirmation message is received.

2. The apparatus as claimed in claim 1 wherein said mobile communication device further comprises a central processing unit, said central processing unit sharing said memory unit with said cooperative messaging logic.

3. The apparatus as claimed in claim 2 wherein said mobile communication device further comprises memory allocation means, said memory allocation means for allocating memory between said cooperative messaging logic and said central processing unit.

4. The apparatus as claimed in claim 1 wherein said mobile communication device further comprises a clock unit, said clock unit for placing a time stamp on outbound messages.

5. A method of distributing messages, said method comprising the steps of:

generating an outgoing message in a mobile communication device;

assigning a unique identifier to said outgoing message;

placing said outgoing message and unique identifier in an outgoing message queue; and periodically transmitting said outgoing message with a wireless transmitter until said mobile communication device receives a confirmation message having said unique identifier.

6. The method of distributing messages as claimed in claim 5 further comprising the step of:

encrypting said outgoing message in said mobile communication device.

7. The method of distributing messages as claimed in claim 5 further comprising the steps of:

assigning a time stamp to said outgoing message; and deleting said outgoing message from outgoing message queues in a plurality of other mobile communication devices if said time stamp indicates said outgoing message is older than a message age limit.

8. A method of distributing messages, said method comprising the steps of:

receiving a message addressed to a device other than said mobile communication device, said message having a time stamp;

placing said message addressed to a device other than said mobile communication device in an outgoing message queue; and transmitting said message addressed to a device other than said mobile communication device from said outgoing message queue onto a wireless medium until said time stamp indicates that said message is older than a message age limit.

9. The method of distributing messages as claimed in claim 8 further comprising the step of:

removing said outgoing message from said outgoing message queue when said mobile communication device receives said confirmation message having said unique identifier.

* * * * *